No. 827,744. PATENTED AUG. 7, 1906.
P. M. MELTON.
WATER MOTOR.
APPLICATION FILED AUG. 17, 1905.

Witnesses
O. K. Reichenbach
E. M. Colford

Inventor
P. M. Melton

Chandlee & Chandlee
Attorneys

UNITED STATES PATENT OFFICE.

PETER M. MELTON, OF WHITAKERS, NORTH CAROLINA.

WATER-MOTOR.

No. 827,744.    Specification of Letters Patent.    Patented Aug. 7, 1906.

Application filed August 17, 1905. Serial No. 274,554.

*To all whom it may concern:*

Be it known that I, PETER M. MELTON, a citizen of the United States, residing at Whitakers, in the county of Edgecombe, State of North Carolina, have invented certain new and useful Improvements in Water-Motors; and I do hereby declare the following to be a full, clear, and exact description of the invention, such as will enable others skilled in the art to which it appertains to make and use the same.

This invention relates to motors, and more particularly to water-motors, and has for its object to provide a water-motor of the revolving-wheel type which may be operated by the current of the stream without the use of a dam or race, a further object being to provide a motor so constructed that its speed may be regulated by varying the depth to which the blades of the wheel enter the water.

A further object is to provide a water-motor embodying these features which may be manufactured at a low cost.

Other objects and advantages will be apparent from the following description, and it will be understood that modifications of the specific construction shown may be made and any suitable materials may be used without departing from the spirit of the invention.

Figure 1:
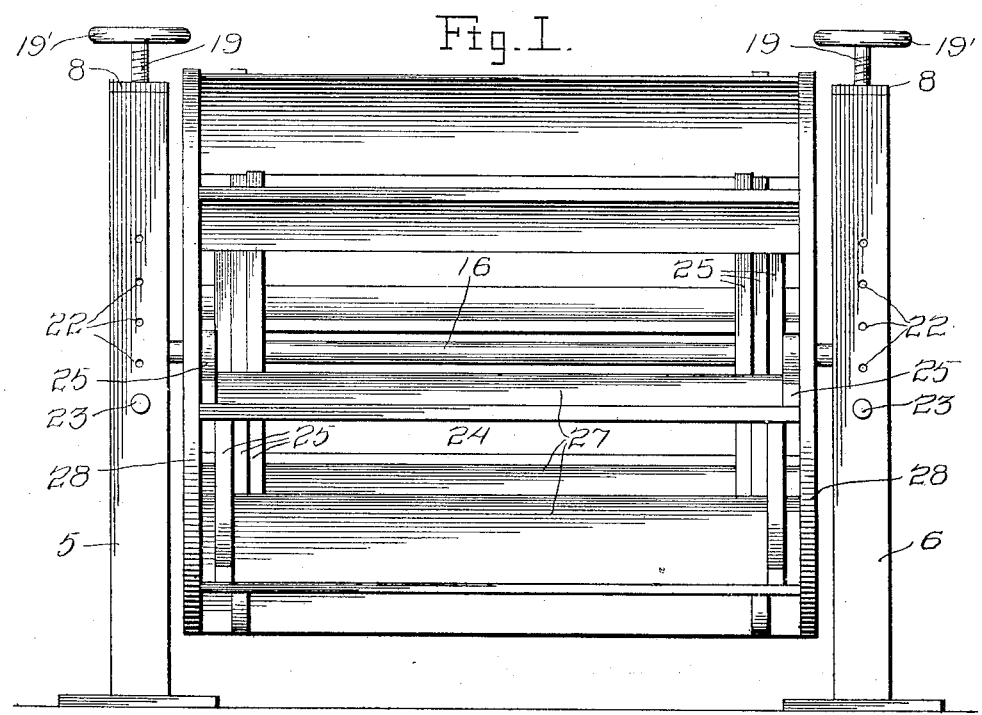
Figure 2:
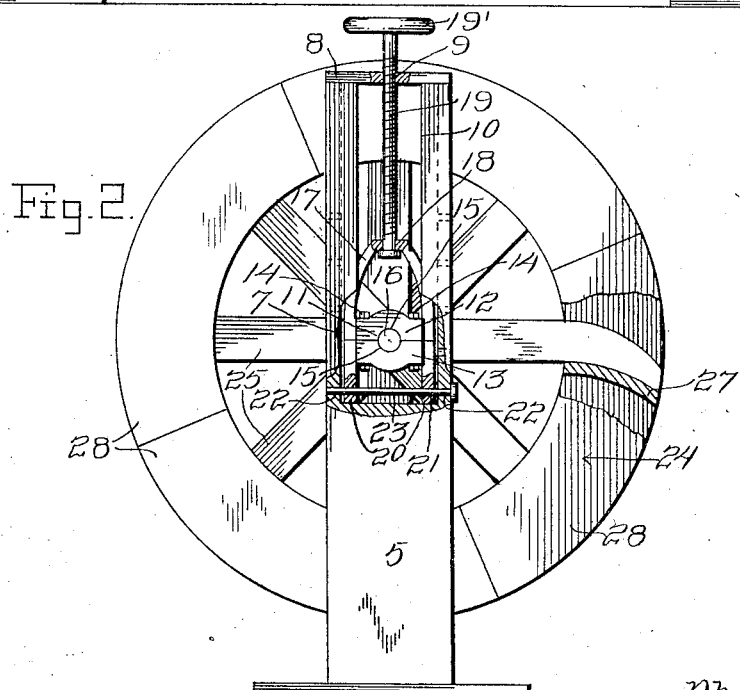

In the drawings forming a portion of this specification, and in which like numerals of reference indicate similar parts in both views, Figure 1 is an elevation of the present invention. Fig. 2 is an end view.

Referring now to the drawings, the present invention comprises two uprights 5 and 6, having openings 7 formed therethrough, these openings extending longitudinally of the uprights and alining with each other, as shown. The openings 7 open through the upper ends of the uprights; but these openings are closed by plates 8, secured at their ends to the upper ends of the uprights at either side of the opening, these plates being provided with central threaded perforations 9.

Formed in the uprights 5 and 6 at opposite sides of the openings 7 and communicating therewith are longitudinal coinciding grooves 10, and slidably disposed in each of the openings 7 with its edges in the grooves 10 is a bearing-block 11. Each of these bearing-blocks consists of two members 12 and 13, secured together by bolts 14, and in the meeting faces of the two members are semicircular notches 15, which coincide with each other to form a bearing for the reception of the spindle 16 of a water-wheel, to be presently described. The members 12 of the bearing-blocks, which are the upper members, are provided with upwardly-extending yokes 17, provided with central perforations 18, in which are revolubly mounted the lower ends of upwardly-extending threaded rods 19, which are engaged in and project through the openings 9 of the plates 8. Depending from the ends of the lower members 13 of the bearing-blocks are ears 20, having alining perforations 21 therethrough, and formed transversely through the uprights 5 and 6 and communicating with the recesses 10 are longitudinal series of alining pairs of perforations 22, with which the perforations 21 may be alined for the reception of a rod 23. The uprights 5 and 6 are spaced from each other, as illustrated, and the water-wheel mentioned above is disposed therebetween, the ends of its spindle 16 being revoluble in the bearing-blocks 11, as already described, and when in use the uprights are disposed in the current of a stream with the water-wheel so arranged that as it is revolved its blades will successively enter the water and receive the force of the current thereof, and, as will be readily understood, the depth to which the blades enter the water may be varied by raising or lowering the bearing-blocks 11, which may be done by revolving the rod 19 through the medium of hand-wheels 19', secured to their upper ends, the strain upon the rods 19 being relieved by the rods 23, which are inserted in the alining perforations 21 and 22.

The paddle-wheel above referred to is indicated at 24 and consists of the spindle 16, adjacent to either end of which there is mounted a plurality of arms 25, which extend in opposite directions beyond the spindle, the arms lying one against another and extending at an angle to each other, these arms being each provided with a central perforation through which the spindle 16 is passed. The arms at either end of the spindle aline in pairs, and secured against the edges of each of these alining pairs of arms adjacent to the ends thereof are the blades 27 of the wheel, to the ends of which and to the outermost pairs of arms are secured the circular end pieces 28 of the wheel. The arms 25 are slightly concaved at the points at which the blades are secured thereto, the blades being slightly concavo-convex and being disposed with their convex surfaces in the concavities of the arms.

What is claimed is—

1. In a water-motor, the combination with a pair of spaced uprights having alining openings therein through their upper ends and having longitudinal grooves in the walls of the openings, of transverse plates secured across the openings and upon the upper ends of the uprights and having threaded openings therein, bearing-blocks slidably engaged in the grooves of each upright and extending across the openings, said bearing-blocks each including upper and lower members having coöperating semicircular spindle-receiving notches therein, an upwardly-extending yoke carried by the upper member of each block, a vertically-threaded rod revolubly engaged at its lower end in the yoke of each block, said rods being engaged in the threaded openings of each plate, hand-wheels carried by the upper end of each rod, a spindle engaged in the notches of the two blocks and extending between the uprights, said uprights having vertical series of alining pairs of openings formed therein and communicating with their grooves, depending ears carried by the lower members of the bearing-blocks and having perforations therethrough arranged for registration with the alining pairs of perforations of the uprights, a rod engaged in the perforations of each pair of ears and in a pair of the alining openings of the corresponding upright, said rod being arranged for engagement into other pairs of openings interchangeably, and a water-wheel mounted upon the spindle between the uprights.

2. In a water-motor, the combination with spaced uprights, of a water-wheel revolubly mounted therebetween and including a spindle, a plurality of arms having central perforations therein with which the spindle is engaged disposed adjacent to either end of the spindle and extending at an angle to each other, said arms lying one against another, the arms at opposite ends of the spindle alining in pairs, said arms having concavities therein and concavo-convex blades secured to the alining pairs of arms adjacent to the ends thereof with their convex surfaces in the concavities of the arms.

In testimony whereof I affix my signature in presence of two witnesses.

PETER M. MELTON.

Witnesses:
G. F. TUCKER,
M. W. EDMONDS.